Patented Dec. 20, 1932

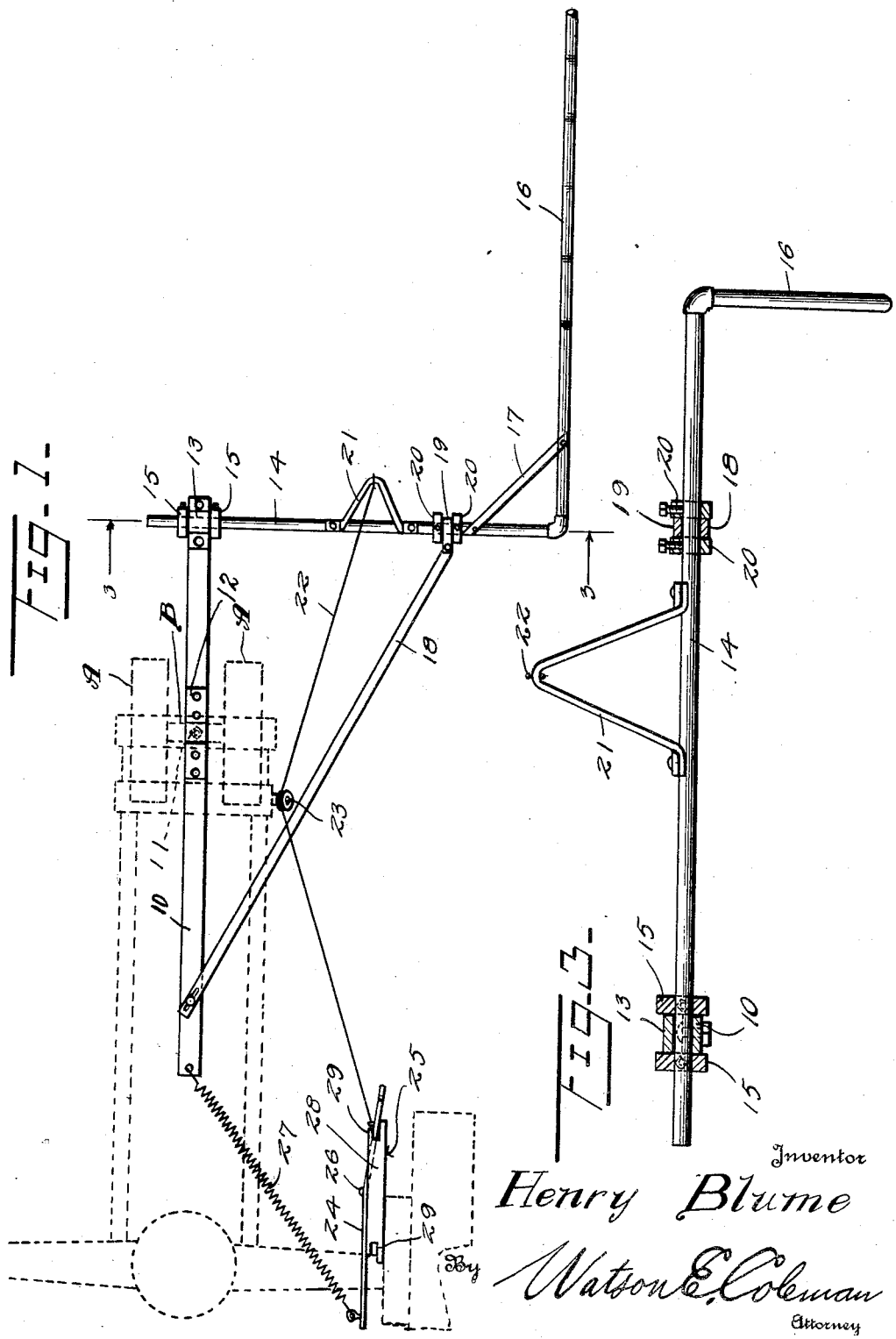

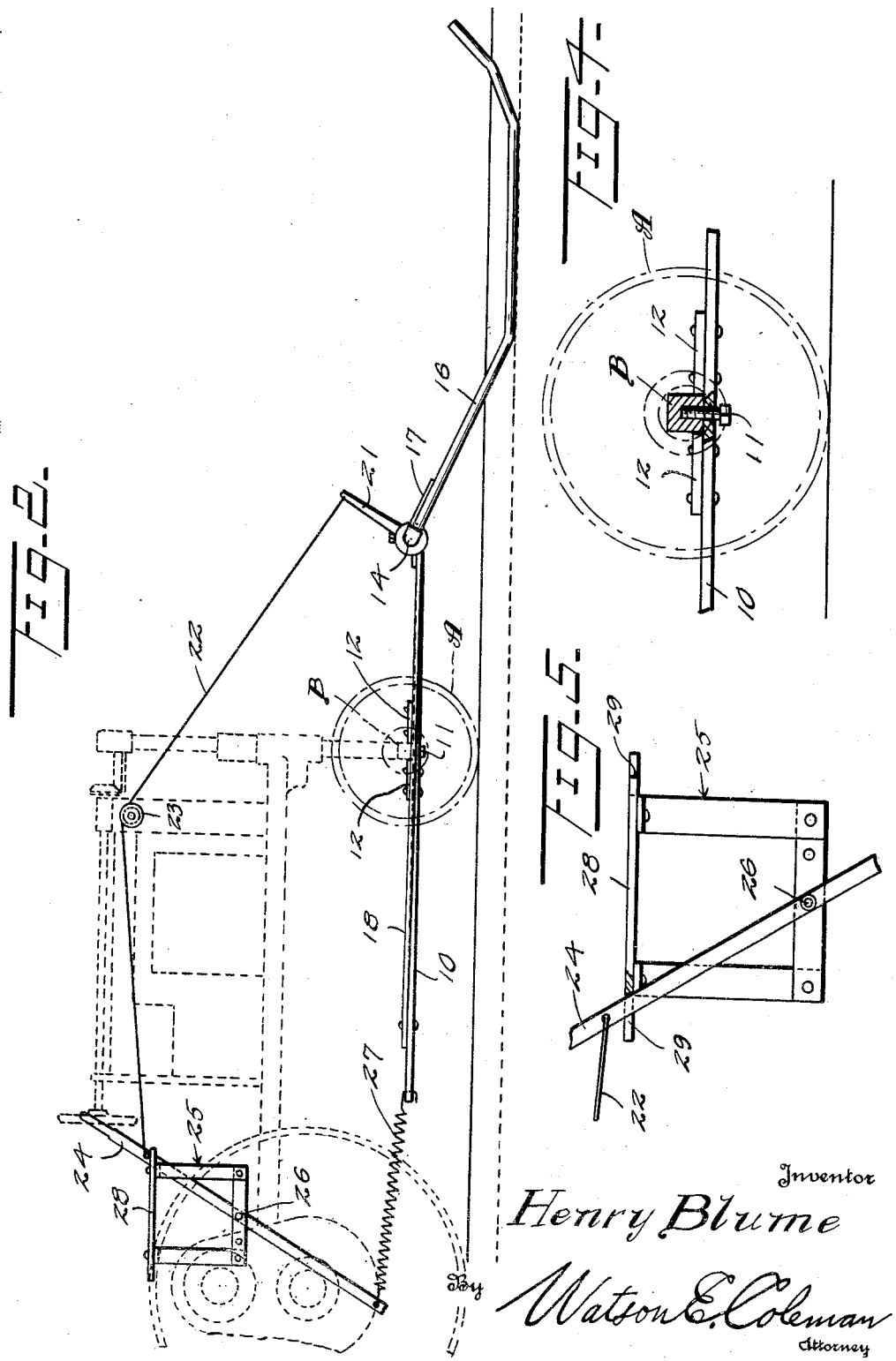

1,891,704

UNITED STATES PATENT OFFICE

HENRY BLUME, OF TULARE, SOUTH DAKOTA

TRACTOR GUIDING DEVICE

Application filed July 7, 1931. Serial No. 549,232.

This invention relates to devices for guiding tractors and particularly to a device which has a forwardly extending member tracking in a previously made furrow, which member will control the steering wheels of the tractor so long as the member is engaged with the furrow.

One of the objects is to provide a very simple mechanism for this purpose, easily applied to ordinary tractors and which may be cheaply constructed, and a further object is to provide means whereby this guiding member may be raised and when raised it will permit the free turning of the guide wheels of the tractor.

Other objects will appear in the course of the following description.

My invention is illustrated in the accompanying drawings, wherein:—

Figure 1 is a top plan view of my tractor guide mechanism, the tractor being shown in dotted lines;

Figure 2 is a side elevation of the structure shown in Figure 1;

Figure 3 is a section on the line 3—3 of Figure 1;

Figure 4 is a fragmentary elevation of the steering wheel controlling bar, the front axle of the tractor being shown in section;

Figure 5 is a side elevation of the lever supporting frame.

Referring to these drawings, I have shown diagrammatically a tractor having front steering wheels A, these steering wheels being oscillatable in a horizontal plane as usual and the steering wheels being mounted upon a transverse shaft B for this steering movement. My guiding attachment comprises a longitudinally extending bar 10 which at its forward end is disposed to extend below the axle B of the tractor and which is held thereto by the set screw 11 and the lateral abutments 12. The forward end of this bar 10 is provided with a strap 13 to receive within it a rock shaft 14 which extends laterally from the bar 10 and is adjustable longitudinally through this bar. Collars 15 held in place by set screws are disposed on the shaft 14 on each side of the strap 13 so as to hold the shaft 14 in its adjusted position. This shaft may be formed of tubing and at its outer end remote from the bar 10, there is provided the forwardly extending guiding member 16 which is preferably formed of pipe and which extends downward, then forward and then upward in a downwardly bowed form, as illustrated in Figure 2. This portion 16 is braced from the transversely extending portion 14 by means of the brace 17 or an equivalent construction.

The shaft 14 is also supported by means of a brace 18 attached at its rear end to the bar 10 and at its forward end having a strap or eye 19 through which the shaft 14 extends. Collars 20 having set screws for holding them in place are disposed on each side of this strap or eye 19 to hold the shaft in adjusted position with relation thereto.

Attached to the shaft 14 and extending upward and outward therefrom is the V-shaped arm 21. Extending upward and rearward from this arm is a cable 22 which passes over a pulley 23 on the radiator of the tractor. This cable then extends rearward and is attached to the upper end of a lever 24. This lever is pivoted upon a frame designated generally 25 and attached to the right hand wheel shield of the tractor. The lever is pivoted at 26. The lower end of the lever 24 is connected to a spring 27, which spring extends forward and laterally and is connected to the rear end of the bar 10. The frame 25 includes an upper plate 28 having notches 29 at its ends into either of which notches the lever may be inserted. When the lever is inserted in the rearmost notch, the cable 22 will be placed under strain and will act to lift the guiding member 16. When the lever 24 is released and placed in the forward notch 29, the guiding member will be lowered.

This spring 27 tends to pull the front wheels of the tractor toward the left and this spring is tensioned when the lever 24 has been fully retracted.

The purpose of the lever 24 is to raise the guide out of the furrow when the end of the furrow has been reached. The spring 27 when the guide is in the furrow exerts a tension which keeps the member 16 up against the edge of the furrow. When the lever is pulled back and the guide member 16 is raised out of the furrow, the tension of the spring is also released which then permits the free turning of the tractor by the usual guide wheel.

It will be seen that I have provided a steering or guiding bar 10 which is connected to shift horizontally with the horizontal shiftable front steering wheels of the tractor and that this bar is connected to a runner or guide which runs within the furrow and that when the guide engages in the furrow, the tension is placed upon the spring so that the guide, while tracking, will cause the tractor to run parallel with the furrow with the wheels turned toward the land side to resist the side draft of the plow which is being drawn by the tractor. When the furrow guide or runner is lifted, however, then the tractor may be steered in the ordinary manner, but when the runner or guide is lowered, the tractor does not need to be manually steered.

The adjustment of the bar 14 transversely is for the purpose of alining the guide 16 up with the rear wheel of the tractor. On tractors of certain makes, the rear wheel runs in the furrow and under these circumstances and if the rear wheel runs in the furrow, the guide should be so set that the guide 16 is directly in front of the right rear wheel. Ordinarily an adjustment of from two to four inches is all that is necessary.

I claim:—

1. The combination with a tractor having a horizontally swingable steering wheel, of a longitudinal bar operatively engaged with the axle of said wheel to cause the wheel to swing in a horizontal plane as the bar is swung, a furrow engaging guide operatively supported upon said bar adjacent one end to swing therewith, a contractile spring engaging the bar adjacent the other end and tending to urge the bar in a direction to swing the wheels toward the land side and away from the furrow, manually operable means for raising or lowering the guide out of or into the furrow, and simultaneously releasing or increasing the tension on said spring.

2. The combination with a tractor having a horizontally swingable forward axle, and a pair of steering wheels theron, of a bar extending longitudinally between said wheels and operatively connected to the axle to swing therewith, a rock shaft carried by the forward end of the bar and extending laterally therefrom and carrying at one end a forwardly extending furrow engaging guide, a lever mounted on the tractor and connected to the shaft to rock it in a direction to raise or lower the guide, and a spring connected to said lever and to the rear end of said bar, the lever acting when shifted in one direction to raise the guide from the furrow and simultaneously decrease the tension on said spring and in the other direction to lower the guide into the furrow and increase the tension on said spring.

3. The combination with a tractor having a horizontally swingable forward axle and a pair of steering wheels thereon, of a longitudinally extending bar disposed between the wheels and operatively connected with the axle to swing it, a rock shaft mounted upon the forward end of the bar and extending laterally therefrom and carrying at one end a forwardly extending furrow engaging guide, the shaft having an upwardly extending arm, a lever pivoted between its ends and mounted upon the tractor toward the rear end thereof, a cable connected to the upper end of the lever and operatively connected to said arm, a contractile spring connected to the lower end of said lever and to the rear end of said bar, and means for holding the upper end of the lever in its retracted position.

4. The combination with a tractor having a horizontally swingable forward axle and a pair of steering wheels thereon, of a bar extending longitudinally between the wheels and operatively connected to the axle to swing it, a rock shaft having one end mounted in a bearing in said bar, the rock shaft being adjustable transversely of the bar through said bearing, the end of the rock shaft remote from the bar having a forwardly extending downwardly bowed furrow engaging guide, a brace extending from the rear end of the bar to said rock shaft and having a bearing through which the rock shaft adjustably passes, an upwardly extending arm on the rock shaft, a lever mounted upon the tractor adjacent its rear end, the lever being pivoted between its upper and lower ends, a cable connected to the upper end of the lever and to said arm and the rock shaft, a contractile spring connected to the lower end of the lever and to the rear end of the bar, and means for holding the upper end of the lever in a retracted position.

5. A steering attachment for tractors having front steering wheels, the attachment comprising a longitudinally extending bar having a bearing through which the axle of the front steering wheels is adapted to pass, a rock shaft mounted upon the forward end of said bar and transversely adjustable therein, a bearing adjacent the outer end of the rock shaft, a brace supporting said bearing and extending to the rear end of said bar, a forwardly extending downwardly bowed furrow engaging guide mounted upon the remote end from the bar, an arm on the rock shaft, a lever support adapted to be attached to the tractor adjacent the rear thereof, a lever pivoted upon said support intermediate its ends, a cable extending from one end of said lever to the arm on said rock shaft, and a contractile spring connected to the other end of said lever and connected to the rear end of said bar.

In testimony whereof I hereunto affix my signature.

HENRY BLUME.